(12) United States Patent
Rohlfs

(10) Patent No.: US 9,741,042 B2
(45) Date of Patent: Aug. 22, 2017

(54) GLOBAL POLLUTION CONTROL SYSTEM EMPLOYING HYBRID INCENTIVE TRADE INSTRUMENTS AND RELATED METHOD OF ESTABLISHING MARKET VALUES

(71) Applicant: DEARBORN FINANCIAL, INC., St. Charles, IL (US)

(72) Inventor: Michael B. Rohlfs, Northbrook, IL (US)

(73) Assignee: DEARBORN FINANCIAL, INC., St. Charles, IL (US)

( * ) Notice: Subject to any disclaimer, the term of this patent is extended or adjusted under 35 U.S.C. 154(b) by 0 days.

(21) Appl. No.: 15/016,796

(22) Filed: Feb. 5, 2016

(65) Prior Publication Data

US 2016/0155132 A1 Jun. 2, 2016

Related U.S. Application Data

(63) Continuation-in-part of application No. 14/401,389, filed as application No. PCT/US2013/041120 on May
(Continued)

(51) Int. Cl.
*G06Q 40/04* (2012.01)
*G06Q 30/00* (2012.01)

(52) U.S. Cl.
CPC ........... *G06Q 30/018* (2013.01); *G06Q 40/04* (2013.01)

(58) Field of Classification Search
None
See application file for complete search history.

(56) References Cited

U.S. PATENT DOCUMENTS 8,103,556 B2 * 1/2012 Robinson ............... G06Q 10/00
705/26.7
9,002,741 B2 4/2015 Rohlfs
(Continued)

FOREIGN PATENT DOCUMENTS

KR 20100061637 A 6/2010
KR 20100135088 A 12/2010

OTHER PUBLICATIONS

International Search Report for Application No. PCT/US2013/041120, ISA/KR, mailed Aug. 21, 2013.
(Continued)

*Primary Examiner* — Robert R Niquette
(74) *Attorney, Agent, or Firm* — Stephen T. Olson; Harness, Dickey & Pierce, P.L.C.

(57) ABSTRACT

A computerized trading exchange ("CTE") for trading hybrid incentive trade instruments ("HITIs") having underlying value associated with CADS (captured agglomerated diesel soot) or other carbon containing feed materials (OC-CFM) which have been processed using thermochemical conversion processes. The CTE may use a computerized storage device configured to store details selected from at least one of certificates, futures, options, forwards, swaps, and spreads associated with the buying and selling of the HITIs. The CTE may store at least one regulation of trading and may be configured to allow a plurality of participants to buy and sell the HITIs. The CTE may be configured to enable communications from buyers and sellers interested in executing orders relating to the HITIs or to the details concerning the HITIs, as well as from at least one party for the purpose of providing specifications concerning the HITIs to be stored by the CTE.

14 Claims, 2 Drawing Sheets

Related U.S. Application Data 15, 2013, now abandoned, which is a continuation of application No. 13/782,313, filed on Mar. 1, 2013, now Pat. No. 9,002,741, and a continuation of application No. 13/558,974, filed on Jul. 26, 2012, now abandoned.

(60) Provisional application No. 61/513,792, filed on Aug. 1, 2011, provisional application No. 61/648,893, filed on May 18, 2012.

(56) References Cited

U.S. PATENT DOCUMENTS

| | | |
|---|---|---|
| 2002/0099587 A1* | 7/2002 | Kakihana .............. G06Q 10/06 705/308 |
| 2002/0198817 A1 | 12/2002 | Dhir |
| 2004/0039684 A1 | 2/2004 | Sandor |
| 2004/0059692 A1 | 3/2004 | Hill et al. |
| 2006/0184445 A1 | 8/2006 | Sandor et al. |
| 2007/0203855 A1 | 8/2007 | Fisher |
| 2008/0033833 A1 | 2/2008 | Senior |
| 2008/0059358 A1 | 3/2008 | Wardley et al. |
| 2008/0177675 A1 | 7/2008 | Arginteanu |
| 2008/0255982 A1 | 10/2008 | Hughes et al. |
| 2008/0270284 A1* | 10/2008 | Cummings ............ G06Q 40/00 705/37 |
| 2008/0288386 A1 | 11/2008 | Ferris |
| 2008/0288416 A1 | 11/2008 | Arnott et al. |
| 2009/0119200 A1 | 5/2009 | Riviere |
| 2009/0177505 A1* | 7/2009 | Dietrich ........... G06Q 10/06375 705/7.37 |
| 2009/0271332 A1 | 10/2009 | Lo et al. |
| 2010/0010926 A1 | 1/2010 | Eckert et al. |
| 2010/0063902 A1* | 3/2010 | Constantz ............ G06Q 10/087 705/28 |
| 2010/0153258 A1 | 6/2010 | Aggarwal et al. |
| 2010/0332275 A1 | 12/2010 | Walsh et al. |
| 2012/0054085 A1 | 3/2012 | Riviere |
| 2013/0036039 A1 | 2/2013 | Rohlfs |
| 2013/0036071 A1 | 2/2013 | Rouwenhorst et al. |

OTHER PUBLICATIONS

Written Opinion of the ISA for Application No. PCT/US2013/041120, ISA/KR, mailed Aug. 21, 2013.

Second Office Action regarding Chinese Application No. 201280048460.0, dated Nov. 23, 2016.

* cited by examiner

GLOBAL POLLUTION CONTROL SYSTEM EMPLOYING HYBRID INCENTIVE TRADE INSTRUMENTS AND RELATED METHOD OF ESTABLISHING MARKET VALUES

CROSS-REFERENCE TO RELATED APPLICATIONS

This application is a continuation-in-part of U.S. patent application Ser. No. 14/401,389, filed on Nov. 14, 2014, which is a National Phase of International Application No. PCT/US2013/041120, filed May 15, 2013; which claims priority to U.S. application Ser. No. 13/782,313, filed Mar. 1, 2013 (now U.S. Pat. No. 9,002,741); U.S. application Ser. No. 13/558,974, filed on Jul. 26, 2012; and U.S. Provisional Patent Application No. 61/648,893, filed May 18, 2012. The disclosures of all of the above applications are hereby incorporated by reference into the present application.

FIELD

The present teachings generally pertain to global pollution control systems, and more particularly to a global pollution control system that employs hybrid incentive trade instruments featuring exchange-established market values that may be traded on a global electronic exchange platform along with other financial instruments.

BACKGROUND

The statements in this section merely provide background information related to the present disclosure and may not constitute prior art.

Selecting pollution control instruments is a crucial environmental policy decision, as evidenced in attempts to forge sovereign and global regulations pertaining to controls for greenhouse gas ("GHG") emissions. However, in that case, debates among policy makers and critics have grown contentious due to fundamental disputes in public, private and academia sectors concerning the extent to which GHG (especially $CO_2$) are global warming ("GW") forces causing CC (hereafter referred to as "GHG Disputes").

Extraordinarily high technology costs and long abatement periods exacerbate GHG Disputes. As a result, risks lurk that the United Nations Kyoto Protocol could fold barring a major turn of events. Due in part to those circumstances, a once-prominent GHG trading post (i.e., Chicago Climate Exchange) recently shuttered following nearly a decade of operations after trading volume plummeted and "carbon credit" (generic term for tradable certificates/permits holding the right to emit one metric tonne of $CO_2$ or the mass of another GHG with a $CO_2$ equivalent to one metric tonne of $CO_2$) prices crashed 99% from their 2008 peaks.

In contrast, there are virtually no major disputes concerning benefits that can be realized by aggressively eliminating diesel PM. The market appears ripe for a global pollution control system based on the collection and eco-friendly recycling of captured agglomerated diesel soot ("CADS"), e.g., in the manner disclosed by in U.S. Ser. No. 61/531,126, assuming that financing mechanisms such as CADS Hybrids can gain traction over a suitable global market. U.S. application Ser. No. 61/531,126 is incorporated by reference as if fully set forth herein.

In some respects, incentive trade instruments employed to help curb GHG emissions in OECD countries, such as emission reduction credit ("ERC") and capped allowance trading ("Cap-and-Trade") systems, serve as trailblazers for the approach adopted in formulating CADS Hybrids. However, there is at least one major distinction: reducing GHG emissions in the OECD involves larger scale initiatives than those involved with abating the effects of super-emitters in countries compromised by needs to employ more affordably available but environmentally less desirable diesel fuels to power economic growth.

The former involves, inter alia, a myriad of extraordinarily costly and long term campaigns comprised of complex technology transformations, fuel conservation, displacement and replacement schemes, and related programs aimed as much at reducing reliance on fossil fuels as abating pollution levels. In fact, some GHG Disputes have involved heated debates as to whether $CO_2$ should be treated as a pollutant.

The latter involves critical shorter term missions focused on DECAT technologies that are essentially already developed, are far less costly and merely require mobilization of forces to expedite mass implementation on a global scale. In fact, many leading scientists warn that time is of the essence to remove black carbon soot from the atmosphere; otherwise, tipping points could occur such that GHG reduction technologies on the drawing board may for all intents and purposes be rendered futile.

In terms of formulating a global pollution control system employing CADS Hybrids, pollution limits can in some cases be rate-based with no set limits on the maximum allowable level of pollution within the regulated area. Instead, pollution limits cannot exceed a specified rate of emissions (e.g., grams per mile or km for mobile vehicles; pounds or kg per MMBtu for power generators and stationary applications). Polluters can earn credits by employing qualified diesel emission control after-treatment ("DECAT") systems designed to verifiably reduce emissions below specified rates. Having no cap on total emissions is appealing to policymakers in developing countries where anticipated economic growth is likely to occur alongside a corresponding increase in the number of individual polluters.

Alternatively, CADS Hybrid Cap-and-Trade systems can be formulated in a manner whereby allowable caps on total emissions are set, with a cap equal to the total number of allowances (permits) allocated to a group of polluters. Group allowances are then distributed among individual polluters. The number of allowances held by each polluter sets limits on levels they are entitled to emit. Allowances can be auctioned, with entities competing to purchase rights. Alternatively, they can be doled out as part of a government program. In any event, once all allowances are placed with rights holders, those entities must either reduce emissions directly or purchase allowances from other rights holders who achieve reductions below the required level.

Although not incorporated directly into the value of CADS Hybrids, other government policy tools are potentially useful as adjuncts to CADS Hybrid systems, such as: emissions taxes, fees and charges; subsidies; combining pollution standards with pricing approaches; and liability assignments.

Grants from sovereign and/or global regulatory bodies, as well as loans from entities dealing in concert with such bodies, can also play integral roles in the success of CADS Hybrid systems formulated.

While diesel-based pollution is without question a substantial global dilemma, pollution caused by the combustion of other major fuels is also troubling, and requires advanced remediation systems requiring sizable capital investments that can likewise be funded by the economic benefits derived from attendant recycling and other initiatives. For example, coal-based power systems have formed an essential part of economies around the world for many decades. Coal is an established electricity source that has provided vast quantities of relatively inexpensive, reliable power and, unfortunately, pollution. When coal is combusted in a furnace, boiler, etc., the ensuing heat is employed to generate steam used to spin one or more turbines to generate electricity.

When coal is combusted, however, significant amounts of residue are generated that require proper disposal or reuse. The largest volume of coal combustion residue consists of fly and bottom ash, along with boiler slag and flue gas desulfurization residue. Fly ash and bottom ash make up the majority. Although fly ash and bottom ash have similar origins, their physical and chemical characteristics differ. Fly ash is made up of relatively small particulate matter. The particulates have diameters typically ranging from 10 to 100 microns. The particulates may be captured and removed from flue (exhaust) gases by electrostatic precipitators, bag filters or other particle filtration equipment before the flue gases escape to the atmosphere via a chimney or stack. If fly ash escapes to the atmosphere, it can be extremely hazardous when inhaled, similar to what is experienced when black carbon soot is emitted by diesel engines.

The combination of black carbon soot emitted from diesel engines, along with fly ash escaping from coal-based power systems, is extremely hazardous, particularly in developing countries such as China. China is presently home to about half of the twenty most heavily polluted cities in the world, with some parts of the country exceeding "doomsday" levels of smoke pollution on an all-too regular basis. Reports published by the organization "Berkeley Earth" posit that air pollution kills an average of 4,000 people per day in China, accounting for 17% of all deaths in China. For about 38% of the Chinese population, the air they breathe is considered unhealthy by U.S. standards. According to a World Health Organization ("WHO") report titled Global Burden of Disease, an estimated 1.2 million Chinese people died prematurely during 2010 due to air pollution, the vast majority of which was caused by the devastating aerosol cocktail of diesel related black carbon soot and coal-based fly ash.

Unlike fly ash, bottom ash adheres to hot sidewalls of coal combustion chambers during their operation, typically falling to the chamber's bottom hopper where it is ultimately cooled and removed. Bottom ash tends to consist of larger, coarser and heavier particles.

Coal ashes are mainly composed of oxides of silica, aluminum, iron, calcium, magnesium and sulfur. In addition to those macro-elements, coal ashes contain several trace elements including arsenic, selenium, boron, cadmium and lead. The concentration of trace elements in coal ashes can be enriched between 2 and 100 times relative to the original coal.

Chemical composition of the two ash types varies with age and maturity of the coal and its origin. For example, ashes from lignite and sub-bituminous coals contain more calcium and magnesium, which form basic solutions when mixed with water. Bituminous coal tends to contain more pyritic iron, resulting in acidic solutions when mixed with water. Concentrations of trace elements, such as arsenic and selenium, tend to be higher in fly ash than in bottom ash. And bituminous fly ash tends to have higher arsenic content than sub-bituminous and lignite coal ashes.

Each year, hundreds of millions of tons of coal combustion residue is produced throughout the world. Less than about 40% is currently used beneficially (i.e. recycled) and the remainder is disposed of in landfills, slurry retention ponds or minefills. Many of these locations are believed to be environmental "ticking time bombs". Fly ash gets recycled more frequently than bottom ash; it's used in concrete to enhance strength and resistance to weathering. Other coal ash benefits include road-base materials, manufactured aggregates and land management uses like flowable fills, structural fills, soil embankments and soil modification materials.

Coal ash hazards stem from the physical properties of, and chemicals in, the ash. In addition to the aerosol issues disclosed above, fine particulate coal ash material can smother terrestrial vegetation and aquatic sediments in nearby rivers or ponds. Dry ash from ash piles not properly maintained pose health risks, particularly those attributable to particles less than 10 microns in diameter.

Although mercury's association with coal is well known, a large proportion of the mercury is vaporized during the combustion process; the remainder tends to be tightly bound to the captured ash particles and thus not released to the atmosphere. Other metals like lead and cadmium are also present at higher amounts in coal ash, with the latter being readily taken up by plants and thus placed into the food chain.

Chemical hazards in ash come from the coal combustion process and often include arsenic, selenium and boron. Because the mercury and chemical elements can be highly mobile in soils and sediments (especially those buried and saturated), they can leach out of ash piles and move into groundwater if pile impoundments are not properly lined. With bottom ash continually piling into landfills, risks associated with potable water contamination from ash leaching are growing substantially. Major disasters have occurred, such as in 2008 when Duke Energy's coal ash pond near Eden, Tenn. spilled hundreds of millions of gallons of contaminated water into the Dan River, which may end up costing cost Duke Energy billions of dollars in remediation and fines.

Municipal solid waste ("MSW") incineration is another process which generates hundreds of millions of tons of refuse each year in the U.S., Europe and Asia. Approximately one-third of incinerated MSW ends up as ash. Incineration serves to concentrate toxic heavy metals normally present in MSW into resultant ash. As a result, MSW ash requires advanced treatment systems to reduce the quantity and mobility of heavy metals within the ash, including but not limited to stabilization, extraction, vitrification and solidification processes.

Waste-to-energy ("WTE") combustion is another process which reduces the mass and volume of non-recyclable MSW refuse that would otherwise require landfilling. WTE combustion typically reduces the volume of MSW refuse by 90% and its solid mass by 70% to 80%. However, the resultant ash, while largely inert, contains concentrations of heavy metals that require advanced treatments to produce usable by-products and provide long-term stability of the metals in the event that the ash is exposed to the environment. Heavy metals such as lead and cadmium can be particularly toxic to biological systems when present in high enough concentrations.

Biomass Combustion is still another process which employs fuel in the form of plant matter (e.g. scrap lumber, forest debris, certain grasses and agricultural crops), manure and other biological material, including waste residues. Biomass is considered a renewable and sustainable source of energy because of the assumption that it will always exist. In industrialized countries, it is expected that the future generation of electricity will increasingly be derived from direct combustion of residues and wastes obtained from biomass.

Because of the high ash content inherent to biomass combustion systems (compared to that caused by burning coal and MSW), major challenges have arisen relating to the efficient management of their residues. Primary concerns involve storage, disposal and usage, as well as the presence of unburned carbon.

While coal, MSW and biomass fuels have been incinerated for decades to create meaningful heat and electricity alternatives to diesel and natural gas powered systems, new advanced thermo-chemical conversion ("TCC") processes—along the lines of those previously disclosed here and U.S. Pat. No. 8,722,002, as it relates to CADS, offer significant advantages over mere incineration. To best understand those advantages, it is important to understand the significant differences between incineration and TCC. Incineration uses its respective source as a fuel, burning it with high volumes of air to form carbon dioxide and heat, with the heat used to make steam that is in turn used to help generate electricity while carbon dioxide escapes to the atmosphere. In addition, substantial amounts of insufficiently burned fly ash and bottom ash are created and captured in the process, most of which is not currently recycled, posing substantial hazards to humans, animals and the environment.

TCC systems similar to what has previously been disclosed in the case of CADS, particularly those employing gasification and/or pyrolysis, facilitate substantially less coal, MSW and biomass based pollutants to escape into the atmosphere. TCC systems, however, provide the benefit of producing valuable solid, liquid and gas by-products, and removing ash from landfill waste streams. This reduces methane emissions and leaching that would otherwise occur if this material were to enter already crowded landfills. Controlled TCC systems can also be integrated with carbon capture and storage systems to substantially eliminate carbon dioxide emissions.

Just as CADS can be recycled (per the disclosures of this invention and U.S. Pat. No. 8,722,002) into fullerenes, which are precursors for the synthesis of high value single walled carbon nanotubes, the recycling of ash and other residues generated by TCC of coal, MSW and biomass can also facilitate recovery of high value by-products including but not limited to rare earth elements ("REE"). As an example of the opportunities emerging in this field, the U.S. Department of Energy's National Energy Technology Laboratory announced on Dec. 2, 2015 that it had selected 10 projects in support of the lab's program on Recovery of REE from Coal and Coal Byproducts.

REE are a series of chemical elements found in the earth's crust. Due to their unique chemical properties, REE are components of many technologies spanning a range of applications, including electronics, computer and communications, transportation, healthcare, and national defense. The demand, cost and availability of REE have grown substantially over recent years, stimulating an emphasis on economically feasible approaches for REE recovery.

During the last 10 years, there has also been a substantial increase in the field of geopolymer science and technologies, with the number of scientific research papers exhibiting exponential growth. Geopolymers are inorganic materials that form long-range, covalently bonded, non-crystalline (amorphous) networks. Various geopolymers have been synthesized from coal fly ash, and to a lesser extent bottom ash.

Another example of high value materials recovered from ash involves commercial uses of geopolymers such as fire and heat resistant coatings and adhesives, medicinal applications, high temperature ceramics, new binders for fire resistant composites, toxic and radioactive waste encapsulation and as cementing components to make concrete. The properties and uses of geopolymers are being explored in many scientific and industrial disciplines, including modern inorganic chemistry physical chemistry, colloid chemistry, mineralogy, geology, and in other types of engineering process technologies.

Yet another example of high value materials recoverable from ash involves zeolites. Zeolites are crystalline aluminum silicates having a structure of tetrahides linked to each other at their corners, creating a three-dimensional network with lots of voids and open spaces that define their many special properties. Conventional open pit mining techniques are used to mine natural zeolites. Alternatively, industrially important zeolites can be synthesized from a wide variety of Si and Al starting materials, e.g., coal fly ash. Zeolites are commonly used as ion-exchange beds in domestic and commercial water purification and softening applications, as well as in commercial adsorbents and catalysts.

There is growing awareness that the types of recycling initiatives noted above can supply alternative materials capable of meeting the growing demand for naturally occurring resources, displacing the need to quarry or mine the naturally occurring resources, thereby offering substantial net marginal economic benefits. In addition, the types of TCC processes aimed at separating and removing metals such as lead and cadmium, as well as elements such as arsenic, selenium and boron, enhance proper land management practices aimed at reducing incidences of hazardous "leach out" of ash piles into groundwater.

All things considered, the timing is ripe for a new system that will help developing countries, as well as developed countries, proactively remediate local and global health, environmental and CC problems caused by diesel PM, as well as the hazardous byproducts of combusting other carbon containing feed materials including but not limited to coal, MSW and biomass.

SUMMARY

In one aspect the present disclosure relates to a global pollution control system for self-funding the installation and operation of systems predicated on the collection and recycling of carbon containing feed materials ("CCFM"). The CCFM may include at least one of agglomerated diesel soot "(CADS"), or coal, municipal solid waste ("MSW") and biomass materials (referred to collectively as other carbon collecting feed material or "OCCFM"), each of which is convertible into valuable by-products, thereby generating realizable health, environmental, recycling and other economic benefits integral to self-funding. The system may comprise at least one system for capturing or collecting pollutants including particulate matter, wherein the particulate matter includes at least one of CADS or the residue of combusted OCCFM. Recycling systems may be included which include thermochemical conversion reactors employing at least one of collected CADS or OCCFM as feedstock for pyrolysis and/or gasification recycling processes, the by-products of which are comprised of at least one of valuable solids, liquid fuels and gases that can be reclaimed, separated, extracted and sold for internal and external commercial use. A computerized trading exchange including a processor may be used for trading hybrid incentive trade instruments having underlying values associated with the byproducts obtained using the recycling systems. The computerized trading exchange may include a computerized storage device in communication with the computerized trading exchange and configured to store details selected from at least one of certificates, futures, options, forwards, swaps, and spreads associated with the buying and selling of the hybrid incentive trade instruments. The computerized exchange may also be configured to:

store a regulation of trading in a memory;

communicate electronically via one or more connections with computerized devices to enable a plurality of participants to buy and sell the hybrid incentive trade instruments;

electronically store details relating to the specifications and compilation of hybrid trade incentive instruments which are provided to the computerized storage device;

communicate with an electronic device of at least one seller to enable an interest to sell a hybrid incentive trade instrument to be presented to and processed by the computerized trading exchange; and communicate with an electronic device of at least one buyer to enable a purchase interest in a hybrid incentive trade instrument to be presented to the computerized trading exchange.

In one aspect the present disclosure relates to a pollution control system comprising a computerized trading exchange for trading hybrid incentive trade instruments. The hybrid trade instruments have underlying value associated with attendant emission control systems. The computerized trading exchange may include a computerized storage device configured to store details selected from at least one of certificates, futures, options, forwards, swaps, and spreads associated with the buying and selling of the hybrid incentive trade instruments. A computerized trading exchange may be included for defining at least one regulation of trading and configured to allow a plurality of participants to buy and sell the hybrid incentive trade instruments. The computerized trading exchange may further be configured to enable communications from at least one party that enables details relating to the hybrid trade incentive agreements to be provided to the computerized storage device, and from at least one seller that enables an interest to sell a hybrid incentive trade instrument to be presented to the computerized trading exchange, and from at least one buyer that enables a purchase interest in a hybrid incentive trade instrument to be presented to the computerized trading exchange.

In another aspect the present disclosure relates to a pollution control system comprising a computerized trading exchange for trading hybrid incentive trade instruments. The computerized trading exchange may include a computerized storage device configured to store details selected from a group consisting of certificates, futures, options, forwards, swaps, and spreads associated with the buying and selling of hybrid incentive trade instrument with underlying value attributed to at least one of:

health and environmental benefits derived from systems that eliminate particulate matter ("PM") and other pollutants from the exhaust of diesel engines or incinerators of OOCFM; and by-products generated by recycling captured agglomerated diesel soot ("CADS") or the residue of combusted (incinerated) OCCFM collected from said systems. The computerized trading exchange may also include a storage for storing at least one regulation of trading and configured to allow a plurality of participants to buy and sell the hybrid incentive trade instruments. The plurality of participants may include globally scattered communities of interest. The plurality of participants may also include at least one party for providing the details to the computerized storage device, at least one seller having an interest to sell in a hybrid incentive trade instrument, and at least one buyer desiring to purchase an interest in a hybrid incentive trade instrument. The computerized trading exchange may provide a transparent, electronic data exchange platform operative to authorize, transmit, receive, match, confirm, report, clear, settle buy and sell orders for the interest in the hybrid incentive trade instrument.

BRIEF DESCRIPTION OF DRAWINGS

The drawings described herein are for illustration purposes only and are not intended to limit the scope of the present disclosure in any way. In the drawings.

DETAILED DESCRIPTION

Figure 1:
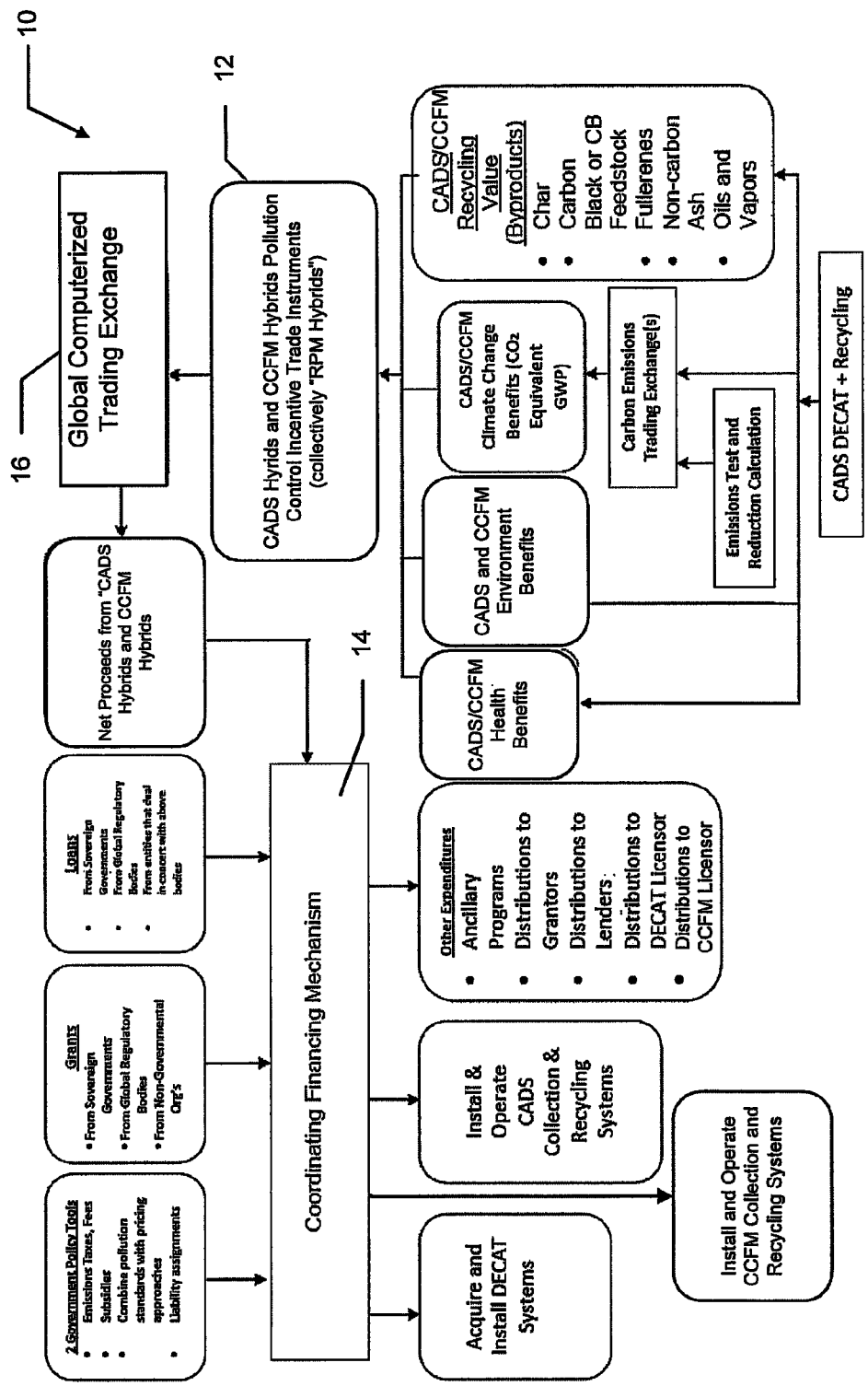
FIG. 1 is a high level flow chart-like diagram of various subsystems that may be used to form a global pollution control system in accordance with the present disclosure.

The present disclosure relates to a global pollution control system that employs hybrid incentive trade instruments featuring exchange-established market values that may be traded on a global electronic exchange platform along with other financial instruments. The following discussion of the various embodiments of the invention and how the invention may be used, will make reference to not only hybrid trade instruments involving CADS, but also to hybrid trade instruments which involve other carbon containing feed materials ("OCCFM") such as coal, MSW and biomass materials, which may be incinerated and/or serve as feedstock into TCC reactors employing gasification and/or pyrolysis processes.

The system's underlying intrinsic benefits are at least two fold: (i) elimination of particulate matter ("PM") and other pollutants from diesel exhaust, and (ii) by-products generated by recycling captured agglomerated diesel soot ("CADS") collected from attendant emission control aftertreatment systems, as well as from systems used to process OCCFM. The financial instruments used to achieve the foregoing may hereafter be referred to as "CADS Hybrid(s)" or "CCFM Hybrids". The present teachings also generally pertain to a method of establishing CADS and OCCFM Hybrid market values, comprised of a global electronic exchange platform that, inter alia, trades CADS and/or OCCFM Hybrid certificates, as well as related indexes, futures, options, forwards, swaps, spreads and other derivatives.

Hybrid systems are financing mechanisms aimed at facilitating aggressive emission control retrofit initiatives and/or CCFM TCC processes in developing countries so their remediation benefits can take hold globally. Both CADS Hybrids and CCFM Hybrids are designed for trading over a global exchange to establish market values that are commensurate with the underlying system's intrinsic co-benefits. Such benefits include, without limitation, (i) valuable CADS and OCCFM recycling by-products, and (ii) net marginal environmental and economic gains realized by eliminating diesel PM (also known as black carbon soot) and other pollutants, as well as the residue of other combusted (incinerated) OCCFM, by attendant emission control and recycling systems designed for health, environmental and climate change ("CC") reasons, as explained more fully below.

In summary then, the present global pollution control system enjoins the forces of, inter alia, CADS Hybrids, OCCFM Hybrids, adjunct government policy tools, grants from sovereign and/or global regulatory bodies, and loans from entities dealing in concert with the bodies. Together, those forces comprise an effective mechanism integral to the process of financing aggressive emission control retrofit initiatives and CADS/OCCFM recycling/recovery processes in various countries so their pollution remediation effects can take hold globally.

Providing the ability to discover and hedge the market value of CADS Hybrids and CCFM Hybrids taking the form of tradable certificates, as well as related indexes, futures, options, forwards, swaps, spreads and other derivatives, is an important embodiment integral to the successful establishment and ongoing viability of a CADS/CCFM Hybrids system. As a result, the present teachings generally pertain to an Exchange where the market price discovery and hedging functions take place over a computerized trading exchange that, inter alia, matches, executes, clears and settles buy and sell orders placed by member and non-member commercials and speculators. The computerized trading exchange may be comprised of globally scattered communities of interest ("COI") operating over a web-based Cloud network in generally the same manner as a method for energy market hedging taught by this Inventor in U.S. application Ser. No. 61/513,792 and in U.S. Pat. No. 9,002,741 to Rohlfs, as explained more fully below. U.S. application Ser. No. 61/513,792 and U.S. Pat. No. 9,002,741 are both hereby incorporated by reference into the present disclosure as if fully set forth herein.

An important feature of present disclosure which is aimed at accomplishing those goals is CADS. Prior to framing the many benefits of this driver, it is instructive to understand CADS genesis within the context of diesel engine exhaust, as well as the nature of CADS collected from DECAT Systems and ultimately recycled via eco-friendly thermochemical conversion ("TCC") processes such as pyrolysis and/or gasification.

When exiting the engine manifold, raw exhaust gases contain a variety of elements (some noxious), that, together, form diesel PM. Those elements traditionally fall into 3 main fractions: solid fraction, soluble organic fraction ("SOF") and sulfate particulates ("SP"). Solid fraction is comprised primarily of elemental (black) carbon, the substance most responsible for visibly offensive smoke emissions, as well as non-carbon ash formed by combustion chamber burning of additives contained in lubricating oil and metal oxide impurities caused by engine wear.

Soluble organic fraction is comprised of hydrocarbons ("HC"), often in nuclei mode, adsorbed onto the surface of black carbon particles or otherwise present as fine droplets. SOF dwell in exhaust gases as lubricating oil-derived HC, higher boiling-end diesel fuel HC and polycyclic aromatic HC ("PAH") with multiple benzene rings joined in cluster forms that are mutagenic and, in some cases, so carcinogenic that they attract serious attention from governmental bodies responsible for the oversight of toxic air regulations.

Sulfate particulates ("SP") are comprised mostly of hydrated sulfuric acid. SP often take a liquid form and dwell in exhaust gases as nuclei mode particles. SP formation depends on vapor pressures, as well as such factors as fuel sulfur level, conversion of fuel sulfur to $SO_3$, air/fuel ratio, temperature and relative humidity.

When DECAT systems taught by U.S. application Ser. No. 61/531,126 ("Attendant DECAT Systems") are installed, PM-laden exhaust gases pass through one or more cooling embodiments prior to entering the system's pivotal diesel particulate converter ("DPC"). Exhaust cooling enhances condensation of heavy and frequently toxic volatile organic compounds ("VOCs") in PM into nano-size particles that are captured at high frequencies and eliminated before exhaust leaves the tailpipe.

Adsorption of cooled condensed nuclei mode ultrafine and nano-particles onto larger (black carbon) PM species is optimized as all tend to bond while migrating through the DPC's agglomerative wire mesh filters prior to soot capture and collection. As a result, exhaust (VOC) toxicity gets eliminated while CADS feedstock is effectively being produced for TCC process recycling.

Absent Attendant DECAT System remediation, VOCs and other harmful elements of PM escape freely into the atmosphere. Once inhaled, toxic ultrafine and nano-particles may penetrate deeply into lung tissues, where they pose serious health threats. Globally, hundreds of thousands of PM toxicity-related excess deaths occur annually. An even greater number of hospital admissions for cardiovascular, respiratory and central nervous system disorders are estimated to cost hundreds of billions of dollars on an annual basis.

Aside from the serious health hazards posed by raw diesel emissions, considerable attention is paid to the adverse environmental effects of black carbon soot, in particular within the context of their role as GW forces causing CC. Black carbon soot is widely recognized as a potent GW coefficient with local and regional impacts, especially in developing countries and icy/snowy regions. This is due to the fact that, while drifting in the atmosphere or falling/settling on the ground, black carbon soot efficiently absorbs sunlight, warms up and radiates heat. Soot accumulating on ice and snow (especially in crucial Arctic and Himalayan regions) reduces albedo (i.e., the ability to reflect light), causing a local melt that reduces reflectivity even further. The result is a positive feedback loop of warming.

Global organizations have lately focused their attention on black carbon soot in light of published research findings by aerosol scientists and climate experts citing its elimination as the most expedient means capable of reversing CC caused by GW forces in the short term. This is due to the fact that the atmospheric life span of black carbon soot is only a few weeks versus many decades for $CO_2$ and other GHG. A consensus appears to be forming that expedited short-term initiatives to reduce black carbon soot emissions should be undertaken in developing countries, not just for health reasons but to buy vital extra time needed for longer-term GHG mitigation measures, viewed more as the prime responsibility of developed (OECD) countries. Such is the goal of the global pollution control system of the present teachings.

However, complexities with the multifaceted aspects of black carbon soot in diesel exhaust cause a dilemma. As it turns out, such PM typically provides not only potent GW forces (in the form of elemental black carbon) but substantial offsetting cooling forces (in the form of sulfates).

A convincing body of scientific research vouches for the vital role sulfates played as the most effective cooling agents known to offset GW forces and resultant CC in the past few decades. In particular, benefits in Northern Hemisphere regions are attributed to cooling effects of SO2/SOx emitting OGVs passing between Asian and U.S. ports. Similarly crucial impacts were felt in Himalayan glacier areas serving as water reservoirs for over one-sixth of the Earth's population.

DECAT+Recycling Solutions disclosed in U.S. application Ser. No. 61/531,126 are designed not only to eliminate PM, thus providing considerable health benefits, but to, inter alia, solve the dilemma caused by black carbon soot's dual/offsetting CC forces, especially in cases involving OGVs. This is achieved by serving up the only known "double whammy" punch aimed at expediting the reversal of CC, comprised of: (i) agglomerating and capturing black carbon soot in DPCs, thus preventing their release into the atmosphere, where they would provide potent GW forces, and (ii) selectively allowing SO2/SOx gases to pass through the DPC, into the atmosphere, so they can provide substantial cooling forces offsetting the effects of GHG and other GW forces residing there.

Multi-faceted benefits created by aforementioned DECAT+Recycling Solutions, which in effect yield the intrinsic value of CADS Hybrids, include but are not limited to the following:

Health benefits derived by eliminating PM (VOC) toxicity, which are achieved by exhaust cooling and DPC agglomeration, as well as eco-friendly methods of recycling via TCC processing.

Environmental benefits derived by preventing black carbon soot from entering the atmosphere or falling to the ground where their chemical makeup and toxicity can damage humans, animals, plants, bodies of water, etc., achieved by collecting and employing CADS as recycling feedstock.

Climate change benefits derived by preventing black carbon soot from providing potent GW force either in the atmosphere or after falling onto snow/ice, whilst selectively allowing $SO_2$/SOx to pass through the DPC and assume beneficial roles as substantial cooling forces in the atmosphere, thus offsetting the effects of GHG and other GW forces.

CADS Recycling values, which are generated after TCC processes (pyrolysis and/or gasification) decompose CADS, inter alia, into the following byproducts:

Char, Carbon Black (CB) or CB Feedstock, Sulfur and Sulfuric Acid, which are salable as commodities.

Fullerenes, which are precursors for the synthesis of single walled carbon nanotubes.

Non-carbon ash, which is used as construction aggregate.

Oils and vapors, which are cooled and condensed into liquid fuels that are burnable directly in boilers and internal combustion engines or can be refined for higher quality uses such as motor oils, chemicals and adhesives.

Gases, which can be burned in a boiler for heat or in an internal combustion engine for electricity generation or combined heat and power, including recirculatable heat and power integral to the TCC process employed, as well as gases that can be scrubbed to remove impurities and converted via Fischer-Tropsch synthesis, hydrotreating, hydrocracking, Claus or other conversion processes into cleaner grades of reusable fuels and chemicals.

Although not imputed directly into the value of CADS Hybrids, supplemental benefits will accrue to countries adopting the solutions taught herein, reflecting the favorable economic impact of new job creation attributed to the following:

Assembling Attendant DECAT System components, in particular the system's pivotal DPCs.

Installing Attendant DECAT Systems onto land based (trucks, buses, construction and mining equipment, power generators, etc.) and marine applications, in particular OGVs with economies of scale sufficient to accommodate integrated onboard DECAT+Recycling.

Ongoing CADS collection from above applications, which are transported to recycling facilities.

CADS Recycling into valuable by-products at dedicated (in this case, newly constructed) TCC processing facilities or contracted sites established with compatible infrastructure. It should be noted that TCC processing is a globally emerging industry with promising long-term prospects, especially in the case of waste-to-energy applications. The chemical composition and kinetic properties of CADS provide synergy for TCC co-processing with other feed stocks.

Administrative, technical and clerical positions ancillary to establishing and maintaining all functions noted above, including but not limited to those at government bodies in charge.

Due to the nascent state of pollution control system development in most countries outside the OECD, few if any developing countries are able to pursue purely market based or command and control environmental policies. Instead of positing micro solutions favoring one environmental policy type or the other on a state-by-state basis, the present disclosure calls for a global system, employing a hybrid approach, which may appeal to many, if not all, countries in need of expediency and economies of scale. An overall diagram shown in FIG. 1 illustrates a diagram of one embodiment of one example of a system 10 of the present disclosure that illustrates the factors and components that go into creating both CADS hybrid trade instruments and OCCFM hybrid trade instruments, collectively referred to as "CCFM hybrid instruments" 12, as well as how a coordinating financing mechanism 14 may be used to receive the net proceeds from CCFM hybrid instruments 12, as well as to receive the benefits derived from other financial instruments and policy tools. The coordinating financing mechanism 14 may take the form of a computerized device running suitable software that implements a set of procedures that may be followed by one or more individuals, or by one or more organizations representing individuals, countries, groups of countries, or other consortiums. The coordinating financing mechanism 14 may be used to generate and disburse funds for various purposes and/or operations, which will be discussed in greater detail in the following paragraphs. A global computerized trading exchange 16 may be used to receive and administer CCFM hybrid incentive trade instruments and to process same (i.e., settle, trade, etc.) before transmitting net proceeds from their sale to other entities or individuals that are in communication with the global computerized trading exchange 16, including the coordinating funding mechanism 14. Such a hybrid approach is centered round the multi-faceted benefits of collecting and recycling CADS and OCCFM recyclable/recoverable residual byproducts, combined with the flexibility to selectively employ such market based and command and control policies as those noted earlier herein.

With regard to the method of establishing CCFM Hybrids market prices, the present teachings call for a computerized global trading exchange to be placed in charge of the following functions, in much the same way as this inventor's teachings per the System for Market Hedging and Related Method contained in U.S. application Ser. No. 13/558,974:

Specifying tradable certificates, as well as indexes, futures, options, forwards, swaps, spreads and other derivatives associated with the buying, selling and delivery of CCFM Hybrids.

Listing certificates, indexes, futures, options, forwards, swaps, spreads and other derivatives that are extended to COI including but not limited to the following: members of the computerized global computerized trading exchange (clearing and non-clearing), commissioned merchants, introducing brokers, trading counter-parties in the form of commercials and speculators (also known as exchange customers), clearinghouses and reporting services, all of which are geographically scattered throughout the world.

Providing a transparent global computerized trading exchange able to authorize, transmit, receive, match, confirm, report, clear, settle and otherwise execute buy and sell orders for all listed certificates, indexes, futures, options, forwards, swaps, spreads and other derivatives with the capability of originating said orders virtually anywhere in the world over a secure web-based Cloud network.

Establishing all global computerized trading exchange policies and rules and overseeing the compliance therewith.

Arranging for all trades to be cleared and settled by qualified clearinghouses.

Obtaining all requisite licenses and other approvals granted by applicable government regulatory bodies.

Implementing all operating and reporting systems and processes conducive to the overall conduct of Exchange business.

The global computerized trading exchange customers noted above may include sovereign and global regulatory bodies placed in charge of maintaining pollution control systems in their respective country, region or sphere, as well as emissions banks qualified for trading by the regulatory bodies and the global computerized trading exchange.

Tradable certificates may be designed, in part, to provide holders with certain carbon credit or CCFM recyclable/recoverable materials rights. The carbon credit rights may be tied to the underlying mass of CCFM expressed in terms of their equivalence to one tonne of $CO_2$, rights which can be traded as part of a mutual listing agreement with one or more of the so-called "green exchanges." The "green" exchanges may include, without limitation, the Green Exchange ("GreenX") located in New York and London.

The favorable net marginal environmental and economic impacts of adopting solutions such as Attendant emission control and CCFM Hybrid systems exceed those associated with mere DECAT solutions being exploited in the OECD. For starters, the aggregate costs of OECD-genre DECAT systems and complementary ultra-low-sulfur diesel ("ULSD") fuel campaigns dwarf the costs of Attendant DECAT Systems capable of tolerating ULSD, as well as diesel fuels with high (500+ ppm) sulfur content. Thus, OECD-genre DECAT Systems are for all intents and purposes prohibitively expensive for developing countries. Further, any comprehensive analysis of OECD-genre DECAT Systems reveals inordinately high costs concentrated in platinum coated catalysts and filters and complex active components needed for diesel particulate filter "regeneration." Diesel particulate filter regeneration is also known as "soot burning." Published research findings posit soot burning as being responsible for increases in the emission of CO2, as well as harmful ultrafine PM. Accordingly, OECD-genre DECAT Systems cannot be said to provide "uplifting" labor and other costs related to engaging an adopting country's underutilized work force. Lastly, since OECD-spawned DECAT Systems produce no CADS, they are unable to generate any recycling or other ancillary economic benefits such as those noted earlier in connection with the presently disclosed global pollution control system.

Figure 2:
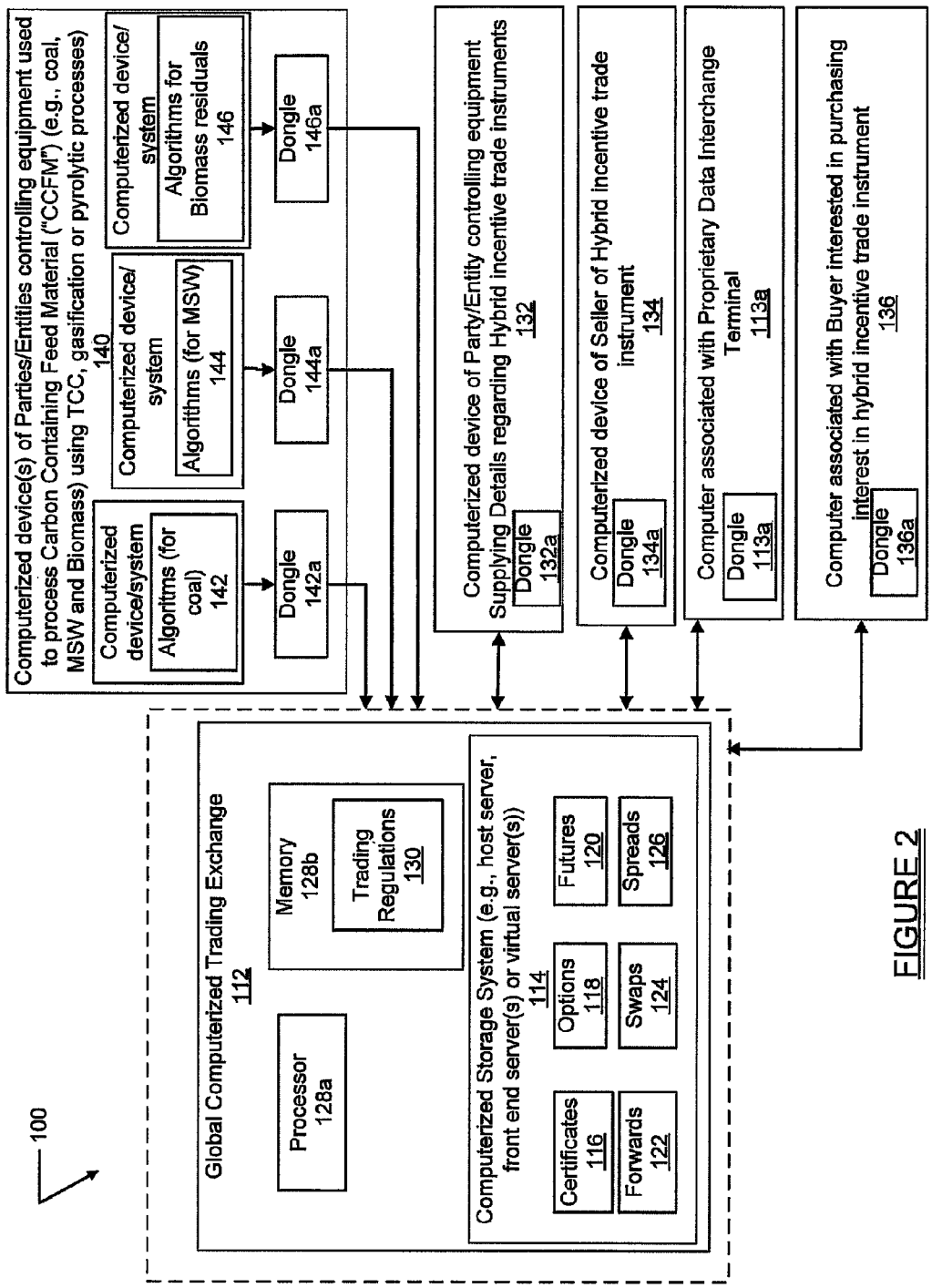
FIG. 2 is a block diagram illustrating various components and their interrelationships for implementing the system of FIG. 1.

Referring to FIG. 2, in accordance with another particular aspect of the present disclosure, a global pollution control system 100 is shown. The system 100 includes a global computerized trading exchange 112 for trading CCFM hybrid incentive trade instruments. The computerized trading exchange 112 may include a computerized storage system 114 configured to store details selected from a group of financial instruments. The instruments may consist of, without limitation, certificates 116, futures 118, options 120, forwards 122, swaps 124, and spreads 126 associated with the buying and selling of a hybrid incentive trade instrument with underlying value. The underlying value may be attributed to (i) health and environmental benefits derived from attendant emission control systems or other gasification and/or pyrolytic processes that eliminate particulate matter ("PM") and other pollutants from diesel exhaust or OCCFM combustion (incineration), and (ii) by-products generated by recycling captured CCFM, collected from the systems. The global computerized trading exchange 112 may include a processor 128a and a memory 128b. The memory 128b may form a mechanism that contains at least one trading regulation 130 and may be configured to allow a plurality of participants to buy and/or sell any one or more of the CCFM hybrid incentive trade instruments 116-126. The plurality of participants may represent globally scattered communities of interest or individuals. The plurality of participants include: a computerized device associated with at least one party/entity 132 for providing details to the computerized storage system 114 as it relates to inter alia the specifications of the CADS Hybrid incentive trade instruments or OCCFM Hybrid incentive trade instruments, as the case may be, as well as related futures, options, forwards, swaps and spreads. The computerized device of the at least one party/entity 132 may also provide details regarding any attendant formulas or algorithms based on underlying emissions tests, aerosol scientist studies, and other data provided by such internationally recognized authorities as the United Nations System of Integrated Environmental and Economic Accounting ("UNSEEA"), the Association of Chartered Certified Accountants ("ACCA") and the International Federation of Accountants ("IFAC"), each of which may be of assistance in estimating the net marginal environmental and economic values attributable to attendant emission control and recycling systems, including the $CO_2$ equivalent GWP that may be mutually listed for trading at a qualifying "green exchange".

FIG. 2 also depicts a computerized device of at least one seller 134 having an interest to sell a CADS or OCCFM hybrid incentive trade instrument, and a computerized device of at least one buyer 136 desiring to purchase an interest in a hybrid incentive trade instrument. The computerized device of the party/entity 132 may use a dongle 132a that connects to the computerized device (e.g., server, laptop, desktop, tablet, etc.). The dongle 132a may be made according to exchange 112 specifications and supplied to a COI as a serialized USB thumb drives or a stick device connectable to independently employed servers or other computing devices. The dongle 132a may use a PIN to reboot its associated computing device (i.e., desktop, laptop, server, tablet, etc.) into an Exchange Cloud-enabled operating environment, or be an integral component of a computer associated with a proprietary data interchange terminal 113 employed by the Exchange 112. Similarly, the computerized device of the seller of CADS hybrid incentive trade instruments 134 may make use of a dongle 134a; the computer associated with the proprietary data interchange terminal 113 may make use of a dongle 113a; and the computerized device associated with the buyer of CADS or OCCFM hybrid incentive trade instruments 136 may make use of a dongle 136a. Dongles 113a, 134a and 136a may be identical in structure to the dongle 132a discussed above. Alternatively or additionally, authorized exchange software downloads taking place at authenticated server hardware over the exchange's Cloud network may be used to facilitate transformational data protection described above.

An additional one or more computer controlled subsystems 140 may be implemented for controlling thermochemical conversion (i.e., gasification or pyrolytic conversion), equipment used to process OCCFM using TCC, gasification and/or pyrolytic processes. This may involve the use of independent algorithms for the net pollution reductions achieved and the recovery/recycling of particulates and other residue from coal (algorithms 142), algorithms for the recovery/recycling particulates and other residue of MSW (algorithms 144) and algorithms for the recovery/recycling of particulates and other residue from Biomass incineration (algorithms 146). Independent processor controlled dongles 142a-146a may be used with the computerized devices/systems. The dongles 142a-146a may be similar or identical in construction to dongle 132a and operate to provide user identification/authentication information, as well as to reboot their associated computerized devices into an Exchange, Cloud-enabled operating environment, after which their respective computerized devices may communicate with the global computerized trading exchange 112 via a suitable wide area network (e.g., the Internet). In this regard it will be appreciated, then that the dongles 142a-146a may include software to assist their respective computerized devices in generating and/or reporting data (e.g., units of one or more quantities of net pollution reductions achieved and by-products recovered during a TCC, gasification or pyrolytic process) which may be assigned values, and thus be used in connection with the formation of hybrid incentivized trade instruments. The dongles 142a-146a may also include software which controls what information is made available to its associated computerized device and what information may be accessed, using the global computerized trading exchange, by the user of the computerized device.

The algorithms 142-146 may also each include one or more specific algorithms for evaluating specific characteristics of the OCCFM that is being processed using recycling/recovery processes (e.g., gasification or pyrolytic process), which specific characteristics enable or facilitate assigning a financial value to the quantity of the particulates and other residues that are recovered and recycled, with such algorithms including the effects of information provided by one or more authoritative entities including but not limited to emissions test providers, aerosol scientists, UNSEEA, ACCA and IFAC.

The global computerized trading exchange 112 provides a transparent, electronic data exchange platform which operates to authorize, transmit, receive, match, confirm, report, clear, settle and otherwise execute buy and sell orders for the interest (i.e., seller 134 or buyer 136) in the hybrid incentive trade instrument. Each party may provide details needed or desired for the specific transaction seeking to be made, and each seller and each buyer each may have a data storage hardware device. The data storage device may include software operative to facilitate transformational data protection via encryption. The plurality of participants may also operate over a web-based Cloud network.

While specific examples have been described in the specification and illustrated in the drawings, it will be understood by those skilled in the art that various changes may be made and equivalence may be substituted for elements thereof without departing from the scope of the present teachings as defined in the claims. Furthermore, many modifications may be made to adopt a particular situation or material to the present teachings without departing from the essential scope thereof. Therefore, it may be intended that the present teachings not be limited to the particular examples illustrated by the drawings and described in the specification as the best mode or presently contemplated for carrying out the present teachings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for implementing a global pollution control system using an affiliated computerized trading exchange having a processor as a substantial funding mechanism, the computerized trading exchange employing hybrid incentive trade instruments ("Hybrid(s)") featuring Exchange-established market values attributed to at least one of elimination of PM and other pollutants from exhaust of diesel engines and by-products generated by recycling CADS collected from Attendant DECAT systems, or a recycling of other carbon containing feed materials ("OCCFM") to obtain by-products therefrom, the global pollution control system being in communication with a geographically dispersed community of interests ("COI"), including the affiliated computerized trading exchange, its members and its customers, the method comprising:

providing a processor controlled donate which is associated with at least one computerized device, the computerized device being associated with the funding of the global pollution control system via the trading of the Hybrids over the affiliated computerized trading exchange;

electronically receiving and storing in a computerized storage system associated with the computerized trading exchange, at least one of specified certificates, indexes, futures, options, forwards, swaps, spreads and derivatives associated with buying, selling, delivery and settling of the Hybrids relating to at least one of CADS or to OCCFM;

using the processor of the computerized trading exchange to help list said certificates, indexes, futures, options, forwards, swaps, spreads and other derivatives that are extended to COI, which relate to the Hybrids, wherein the COI include at least one of:

members of the Exchange;
commissioned merchants;
introducing brokers;
trading counterparties in the form of commercials and speculators;
clearinghouses;
entities responsible for controlling equipment used in connection with the collection, thermochemical processing and recycling of at least one of the CADS or the OCCFM; and
reporting services, configuring the processor of the computerized trading exchange, in connection with stored trading regulations in the memory of the computerized trading exchange to at least one of electronically authorize, transmit, receive, match, confirm, report, clear, settle and execute buy and sell orders for at least one of said specified certificates, indexes, futures, options, forwards, swaps, spreads and derivatives relating to the Hybrids, wherein said orders originate and are electronically transmitted from geographically remote locations over a secure network;

using the computerized trading exchange to:
store policies and rules in a memory thereof and to monitor compliance therewith relating to the Hybrids;
arrange for trades relating to the Hybrids to be cleared and settled by at least one clearinghouse;
obtain requisite licenses and approvals granted by applicable government regulatory bodies associated with the global pollution control system, relating to the Hybrids; and
implement operating and reporting systems to facilitate conducting business relating to funding sources and requirements of the global pollution control system and the attendant trading of the Hybrids over the computerized trading exchange; and using the processor controlled dongle with at least one computerized device associated with an authorized entity responsible for controlling equipment used to collect, thermochemically process or recycle at least one of the CADS or the OCCFM, the processor controlled dongle configured to assist its respective said computerized device in at least one of generating or reporting data to the global pollution control system and its said affiliated computerized trading exchange, the data relating to units of one or more quantities of at least one of net pollutant reductions and recycled by-products that are inherent to the formulation and valuation of the Hybrids.

2. The method of claim 1, wherein the certificates, indexes, futures, options, forwards, swaps, spreads and other derivatives are directly or indirectly linked to a market value of at least one of CADS' or OCCFM intrinsic co-benefits, comprised of at least one of the following:

health benefits derived by eliminating PM (VOC) toxicity, which are achieved by exhaust cooling and DPC agglomeration, as well as eco-friendly methods of recycling via TCC processing;

environmental benefits derived by preventing black carbon soot from entering the atmosphere or falling to the ground where a chemical makeup and toxicity thereof damages at least one of humans, animals, plants, and bodies of water, which are achieved by collecting and employing at least one of CADS or OCCFM as recycling feedstock;

climate change benefits derived by preventing black carbon soot from providing potent GW forces either in the atmosphere or after falling onto snow/ice, whilst selectively allowing $SO_2$/SOx to pass through the DPC and assume a beneficial role as substantial cooling forces in the atmosphere, so as to offset the effects of GHG and other GW forces residing there;

CADS or OCCFM recycling values, which are realized after TCC processes (pyrolysis and/or gasification) decompose CADS or OCCFM, inter alia, into at least one of the following byproducts:
char, carbon black (CB) or CB feedstock, sulfur and sulfuric acid, which are salable as commodities;
fullerenes, which are precursors for the synthesis of single walled carbon nanotubes;
non-carbon ash, which is used as construction aggregate or as precursors for the recovery and/or synthesis of rare earth elements, zeolites and geopolymers and;
oils and vapors, which are cooled and condensed into liquid fuels that are burnable directly in boilers and internal combustion engines or refineable for higher quality uses such as motor oils, chemicals and adhesives; and
gases, which are able to be burned in a boiler for heat or in an internal combustion engine for electricity generation or combined heat and power, including recirculatable heat and power integral to the TCC process employed, as well as gases that are able to be scrubbed to remove impurities and converted via Fischer-Tropsch synthesis, hydrotreating, hydrocracking, Claus or other conversion processes into cleaner grades of reusable fuels and chemicals.

3. The method of claim 1, wherein the global pollution control system and its said affiliated computerized trading exchange are is configured to communicate with each other and with a front-end populated by the COI with at least one front end server acting as a flexible portion of the web-based Cloud network;
wherein the processor controlled dongle is loaded with software needed to facilitate transformational data protection via encryption that bit-splits data from multiple slices or shares and adds authentication and fault tolerant information as data moves through the web-based Cloud network, enabling COI to share the same network infrastructure while restricting non-authorized COIs or a population at large accessing data that is not intended to be available, thereby providing controls over what specific data can be accessed at any given time, where data is stored and who manages various storage needs and server networks; and
wherein the computerized trading exchange further communicates with storage networks which are multifaceted and scalable to sufficiently accommodate one or more facilities dedicated solely to implementing the global pollution control system and its affiliated computerized trading exchange, and at qualified remote shared Cloud data resource centers independently contracted by either affiliate.

4. The method of claim 3, wherein the front-end server is configured in accordance with at least one of:
COI users' independently employed personal computers, tablets, smart phones, and data interchange terminals tied to other trading systems subject to requirements that they are compatible with the computerized trading exchange provided software applications and interconnected with at least one of:
the processor controlled dongle, which is configured to communicate with the computerized trading exchange; or
proprietary data interchange terminals made to predetermined specifications and containing the requisite software applications and a requisite dongle; or
a downloadable software component configured to run on a computing device and to enable communications with the computerized trading exchange.

5. The method of claim 4, wherein the processor controlled dongle is made according to specifications set by the computerized trading exchange and supplied to COI either as at least one of serialized USB thumb drives or stick devices connectable to independently employed servers; and wherein the processor controlled dongle uses a PIN to reboot the server into a computerized trading exchange Cloud-enabled operating environment, or as an integral component of the computerized trading exchange's proprietary data interchange terminal.

6. The method of claim 3, wherein the front-end server is employed to perform the following functions:
  receive a notification from the computerized trading exchange regarding the user's authorized status as well as all software applications and updates;
  confirm a relationship with entitled intermediaries, including the terms and conditions associated with commissions and fees ("C&F") margin guarantees;
  transmit trade orders to the computerized trading exchange in the form of bids and offers that, denote the following:
    type of contract or agreement including certificates, indexes, futures, options, forwards, swaps or spreads, as well pertinent expiration and delivery dates;
    type of financial settlement or physical delivery;
    delivery point; and
    bid or offer price and volume in terms of number of contracts, each of which is denominated in the mass weight of the underlying commodity; and
  receive notifications from the computerized trading exchange regarding at least one confirmed and executed trade, money payable or receivable in connection with open trades, settled trades and entitled intermediaries' C&F.

7. The method of claim 3, wherein the host server is employed to perform the following functions:
  notify all virtual front-end servers of their authorized COI status, as well as all computerized trading exchange and clearinghouse policies, rules, and updates concerning at least a plurality of computerized trading exchange traded certificates, indexes, futures, options, forwards, swaps, spreads, position limits and margin requirements;
  distribute all software applications and updates provided by the computerized trading exchange to authorized COI virtual servers;
  receive all authenticated customer bids/offers, which are posted and matched with the posted offers/bids of other customers, resulting in confirmations of all executed trades, the data of which is then transmitted to affected trade parties and entitled intermediaries, as well as to a contracted clearinghouse of the computerized trading exchange, and a reporting service firm;
  facilitate, via the clearinghouse contracted by the computerized trading exchange, the posting and maintenance of required margin levels based on attendant open trade positions;
  facilitate, via the reporting service contracted by the computerized trading exchange, the reporting of trade activity conducted at the computerized trading exchange including posted prices and volumes associated with open bids and offers, executed and open trades, open interest, settled trades and historical data;
  based on confirmations received from applicable COI and underlying executed trade data, compute C&F and other charges associated with each open and settled trade, and notify all affected parties of their respective amounts payable or receivable in connection therewith; and
  provide a platform for account and payment management, alerts and entitlements in connection with the payable or receivable amounts noted directly above.

8. The method of claim 3, wherein at least one of the computerized trading exchange's commercial trading counterparties employ computerized devices in communication with the computerized trading exchange's host server, with said computerized devices recording the amount of CADS and OCCFM collected and recycled via thermochemical conversion processes, respectively, so that said recorded amounts serve as the basis for certificates that are delivered to the computerized trading exchange in connection with the settlement of the Hybrids.

9. The method of claim 1, wherein the trade margining, marks-to-market, clearing and settlement functions are performed by qualified clearinghouses using at least one of an affiliate of the computerized trading exchange or an independently contracted clearinghouse, each being a COI in the web-based Cloud network.

10. The method of claim 1, wherein the Hybrid certificates which are specified, listed and traded provide holders with carbon credit rights tied to the underlying mass of CADS or OCCFM expressed in terms of the $CO_2$ equivalent of one tonne of $CO_2$, rights that can be traded as part of a mutual listing agreement with one or more of the so-called "green exchanges," including the Green Exchange ("GreenX").

11. The method of claim 10, wherein the underlying mass of CADS or OCCFM is delineated into verifiable levels of reduced GW force black carbon soot, as well as accompanying $SO_2$/SOx emissions serving as substantial cooling forces offsetting GHG and other GW forces residing in the atmosphere, with said levels verified by independent emissions tests approved by requisite regulatory bodies and independent scientific research findings.

12. The method of claim 11, wherein the independent emission test facilities compare baseline PM emissions of the subject diesel engine exhaust with the subsequent PM emissions of the same diesel engine subject fitted with an Attendant DECAT system, with the eliminated PM expressed in terms of grams per mile or kg for mobile applications and pounds or kg per MMBtu for power generators and other stationary applications.

13. The method of claim 1, wherein the global pollution control system uses a coordinating financing mechanism to coordinate the use and application of funds generated by at least one of CADS Hybrids or Hybrids relating to OCCFM residue and/or recycled OCCFM by-products, as well as by one or more of the following:
  adjunct government policy tools;
  grants from sovereign bodies;
  grants from global regulatory bodies; or
  loans from entities dealing in concert with either of said sovereign or global regulatory bodies.

14. The method of claim 1, wherein:
  at least one of the CADS Hybrids or OCCFM Hybrids are linked to sovereign and global regulatory environmental policies employing emission reduction credit and/or capped allowance trading ("Cap-and-Trade") systems, including Cap-and-Trade systems employing estimated net marginal environmental and economic value data provided by internationally authoritative entities such as recognized aerosol scientists, the United Nations System of Integrated Environmental and Economic Accounting, the Association of Chartered Certified Accountants and the International Federation of Accountants; and
  wherein at least one member or commercial trading counterparty of the computerized trading exchange is a sovereign or global regulatory body in charge of maintaining pollution control systems in its respective country, region or sphere;

wherein at least one member or commercial trading counterparty customer of the computerized trading exchange is an emissions bank qualified for trading by said regulatory bodies and the computerized trading exchange.

* * * * *